United States Patent
Ossareh et al.

(10) Patent No.: US 9,765,688 B2
(45) Date of Patent: *Sep. 19, 2017

(54) METHODS AND SYSTEM FOR CONTROLLING COMPRESSOR SURGE

(71) Applicant: Ford Global Technologies, LLC, Dearborn, MI (US)

(72) Inventors: Hamid-Reza Ossareh, Ann Arbor, MI (US); Todd Anthony Rumpsa, Saline, MI (US); Adam Nathan Banker, Canton, MI (US); Matthew John Gerhart, Dearborn Heights, MI (US); Gregory Patrick McConville, Ann Arbor, MI (US); Baitao Xiao, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

This patent is subject to a terminal disclaimer.

(21) Appl. No.: 14/567,110

(22) Filed: Dec. 11, 2014

(65) Prior Publication Data

US 2016/0169096 A1    Jun. 16, 2016

(51) Int. Cl.
| | |
|---|---|
| *F02B 39/16* | (2006.01) |
| *F02B 37/16* | (2006.01) |
| *F02B 37/12* | (2006.01) |
| *F02B 33/40* | (2006.01) |
| *F02B 39/04* | (2006.01) |
| *F02M 35/10* | (2006.01) |
| *F02D 41/00* | (2006.01) |

(52) U.S. Cl.
CPC .............. *F02B 39/16* (2013.01); *F02B 33/40* (2013.01); *F02B 37/12* (2013.01); *F02B 37/16* (2013.01); *F02B 39/04* (2013.01); *F02D 41/0007* (2013.01); *F02M 35/10157* (2013.01); *F02M 35/10255* (2013.01); *F02B 2037/125* (2013.01); *F02D 2200/503* (2013.01); *F02D 2200/602* (2013.01); *F02D 2200/604* (2013.01); *Y02T 10/144* (2013.01)

(58) Field of Classification Search
CPC . F02D 9/00; F02D 41/0007; F02M 2700/331; F02M 35/10255

See application file for complete search history.

(56) References Cited

U.S. PATENT DOCUMENTS

| | | | |
|---|---|---|---|
| 6,871,498 B1 * | 3/2005 | Allen ................... | F02D 41/0007 60/608 |
| 7,757,549 B2 * | 7/2010 | Andreae ............. | F02D 41/0007 73/114.77 |

(Continued)

FOREIGN PATENT DOCUMENTS

| | | |
|---|---|---|
| EP | 2014894 A1 | 1/2009 |
| WO | 2013074503 A1 | 5/2013 |

*Primary Examiner* — Mary A Davis
(74) *Attorney, Agent, or Firm* — Julia Voutyras; McCoy Russell LLP (57) ABSTRACT

Systems and methods for operating a compressor and a compressor recirculation valve of a turbocharged engine to avoid the possibility of compressor surge are presented. The systems and methods position the compressor recirculation valve responsive to a compressor surge line that is based on two other compressor surge lines that may be a function of compressor pressure ratio and compressor flow.

14 Claims, 4 Drawing Sheets

(56) References Cited

U.S. PATENT DOCUMENTS

| | | | |
|---|---|---|---|
| 7,762,068 B2* | 7/2010 | Tabata | F02D 23/02 |
| | | | 60/608 |
| 8,001,778 B2 | 8/2011 | Sun | |
| 9,279,374 B2* | 3/2016 | Buckland | F02D 41/0007 |
| 2012/0121376 A1* | 5/2012 | Huis In Het | |
| | | Veld | F04D 27/0207 |
| | | | 415/1 |
| 2013/0118166 A1 | 5/2013 | Bjorge et al. | |
| 2014/0260241 A1* | 9/2014 | Jankovic | F02D 41/0007 |
| | | | 60/602 |

\* cited by examiner

METHODS AND SYSTEM FOR CONTROLLING COMPRESSOR SURGE

FIELD

The present description relates to methods and a system for controlling surge of a compressor supplying air to an engine. The methods and systems may be particularly useful for engines having turbochargers and compressor recirculation valves.

BACKGROUND AND SUMMARY

Turbocharged engines include compressors that may supply compressed air to the engine to increase engine power. The compressors may experience surge or flow oscillations when a pressure ratio across the compressor is high and flow through the compressor is low. Compressor surge may be graphically depicted via a compressor surge line. The compressor surge line is a line that indicates when a compressor enters surge, and the line may be expressed as a function of compressor pressure ratio and compressor flow. One way to mitigate compressor surge is to allow air to flow from the compressor's outlet to the compressor's inlet via a compressor recirculation valve. By allowing flow from the compressor's outlet to the compressor's inlet, flow through the compressor is increased, thereby allowing the compressor to avoid crossing the surge line and entering a surge condition. However, if the compressor recirculation valve opens farther than desired, such that the flow through the compressor bypass increases more than is desired, vehicle performance may degrade more than is desired.

The inventors herein have recognized the above-mentioned issues and have developed an engine operating method, comprising: providing a first compressor surge line and a second compressor surge line; blending the first compressor surge line and the second compressor surge line into a third compressor surge line; and operating the recirculation valve in response to the third compressor surge line.

By adjusting a compressor recirculation valve position in response to a compressor surge line that is based on a base compressor surge line and a soft compressor surge line, it may be possible to provide the technical result of reducing the possibility of compressor surge while providing acceptable engine performance. For example, a base compressor surge line may be a surge line that if crossed during compressor operation causes compressor flow oscillations that are greater than a threshold. The soft compressor surge line may be a surge line that if crossed during compressor operation causes audible noise that may be undesirable and low amplitude compressor flow rate changes. The base compressor surge line and the soft compressor surge line may be the basis for a surge line that varies based on vehicle performance criteria. If lower vehicle performance is deemed acceptable during present operating conditions, the basis for controlling the compressor is a surge line that is closer to the soft compressor surge line. If higher vehicle performance is desired during present operating conditions, the basis for controlling the compressor is a surge line that is closer to the base compressor surge line.

The present description may provide several advantages. In particular, the approach may provide for acceptable vehicle performance and compressor surge control. Further, the approach may provide vehicle performance that is based on select operating conditions. Additionally, the approach may be applied to a variety of differently configured turbocharged engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
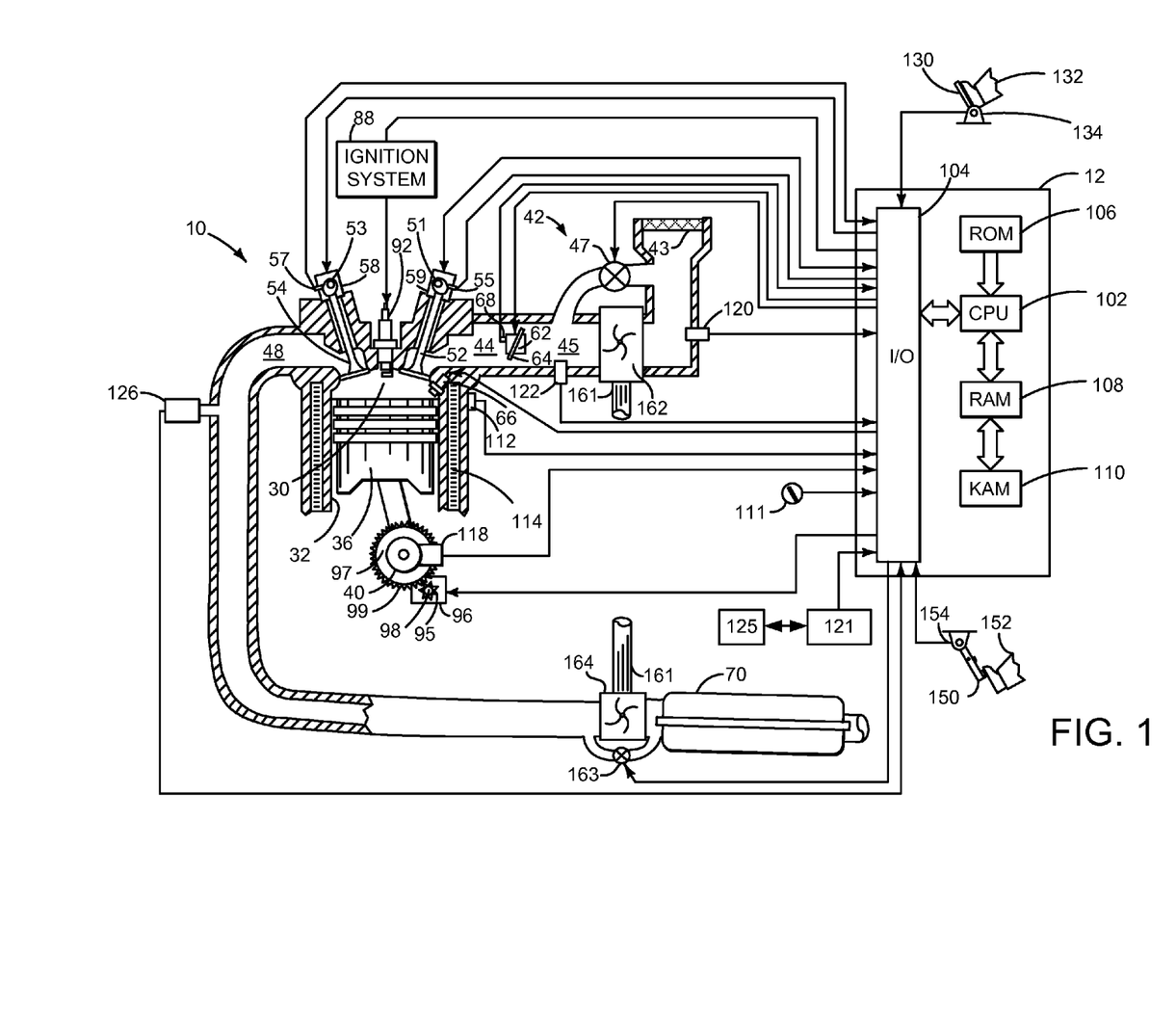
FIG. 1 is a schematic diagram of an engine.

The present description is related to operating an engine with a turbocharger and a compressor recirculation valve. The turbocharger may be incorporated into an engine as is shown in FIG. 1. The turbocharger may have surge characteristics similar to those shown in FIG. 2. The engine may be part of a system that includes a controller with instructions for the method of FIG. 3. The system of FIG. 1 and the method of FIG. 3 may operate to provide the sequence of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Electric energy storage device 121 (e.g., a battery, capacitor, or other charge storage device) supplies electrical energy to starter 96 and electrical machine 125. Electrical machine 125 may charge electrical energy storage device 121 during regenerative braking. Electrical machine 125 may also be directly mechanically coupled to crankshaft 40 of engine 10, or it may be mechanically coupled to crankshaft 40 via a transmission (not shown). Electrical machine 125 may provide torque to a driveline including a transmission (not shown) when operating in a motor mode to augment torque provided to the same driveline and transmission via engine 10. Further, engine 10 may charge electric energy storage device 121 via electric machine 125 operating in a generator mode.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; selected vehicle mode via vehicle mode switch 111; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 provides for a system, comprising: an engine; a turbocharger including a compressor mechanically coupled to the engine; a recirculation valve positioned in an air intake of the engine in parallel with the compressor; and a controller including instructions stored in non-transitory memory for adjusting an opening amount of the recirculation valve in response to a compressor surge line that is based on two other compressor surge lines. The system includes where a first of the two other compressor surge lines is a base surge line. The system includes where a second of the two other compressor surge lines is a soft surge line.

In some examples, the system includes where the soft surge line is based on compressor pressure ratios where a slope of a constant compressor speed curve is positive. The system further comprises additional instructions to adjust the compressor surge line based on a vehicle control parameter. The system includes where the vehicle control parameter is a battery state of charge. The system includes where the vehicle control parameter is a vehicle operating mode.

Figure 2:
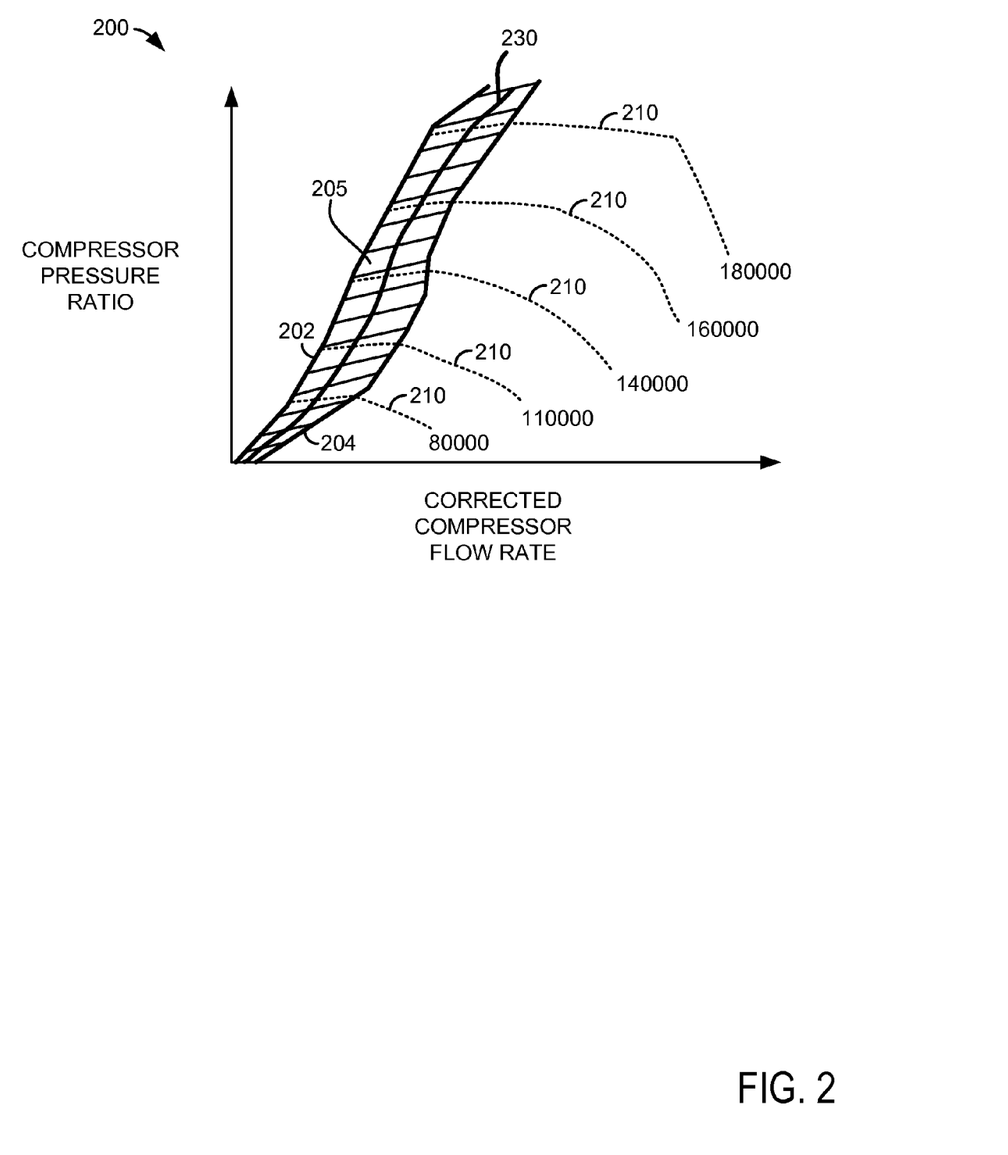
FIG. 2 is a plot that shows base and soft surge lines for a turbocharger compressor.

Referring now to FIG. 2, a prophetic plot of a turbocharger compressor map is shown. The compressor map includes a vertical Y axis that represents turbocharger compressor pressure ratio. The turbocharger compressor ratio increases in the direction of the Y axis arrow. The compressor map includes a horizontal X axis that represents turbocharger compressor flow rate. The turbocharger compressor flow rate increases in the direction of the X axis arrow. Dashed lines 210 represent curves of compressor ratio versus compressor flow at constant compressor speeds. The compressor speeds are listed next to their corresponding curves.

Curve 202 represents a base compressor surge line. If a compressor operates to the left of curve 202 the compressor will provide oscillating flow rates greater than a threshold. In other words, the compressor output flow rate may exhibit a peak-to-peak flow rate that is greater than desired. The compressor may become stressed and degraded if it is operated to the left of curve 202 for an extended period of time. Curve 202 may be empirically determined and stored in controller memory.

Curve 204 represents a soft compressor surge line for aggressive compressor surge mitigation. If the compressor operates to the left of curve 204, but to the right of curve 202, the compressor may exhibit low amplitude output flow rate oscillations. The low amplitude flow rate oscillations may not degrade compressor operation, but they may be undesirable from an audible perspective. Curve 204 may be empirically determined and stored in controller memory. In one example, the soft compressor surge line is based compressor ratios and flow rates where the constant compressor speed curves have a positive slope. In this example, curves 210 have positive slopes to the left of curve 204. Thus, soft surge line curve 204 follows a path where a positive slope portion of the constant compressor speed curves transition to flat or negative slope portions of the constant compressor speed curves. Cross hatched area 205 represents the soft surge compressor region.

Curve 230 represents one example of a blend of curve 202 and curve 204. In other examples, curve 230 at its extents may follow curve 202 or curve 204. Further, curve 230 (e.g., a blended surge line) may move between curve 202 and 204 based on vehicle operating conditions. For example, curve 230 may be closer to curve 202 if a state of charge (SOC) of an energy storage device is less than a threshold. By moving blended curve 230 closer to curve 202, engine torque response may be improved and compressor airflow may be increased at a time when an electric motor may not be able to provide as much torque as is desired due to a low state of charge stored in the electric energy storage device. In this way, adjustments may be made to a blended surge line tailor engine response and performance to vehicle operating conditions.

Figure 3:
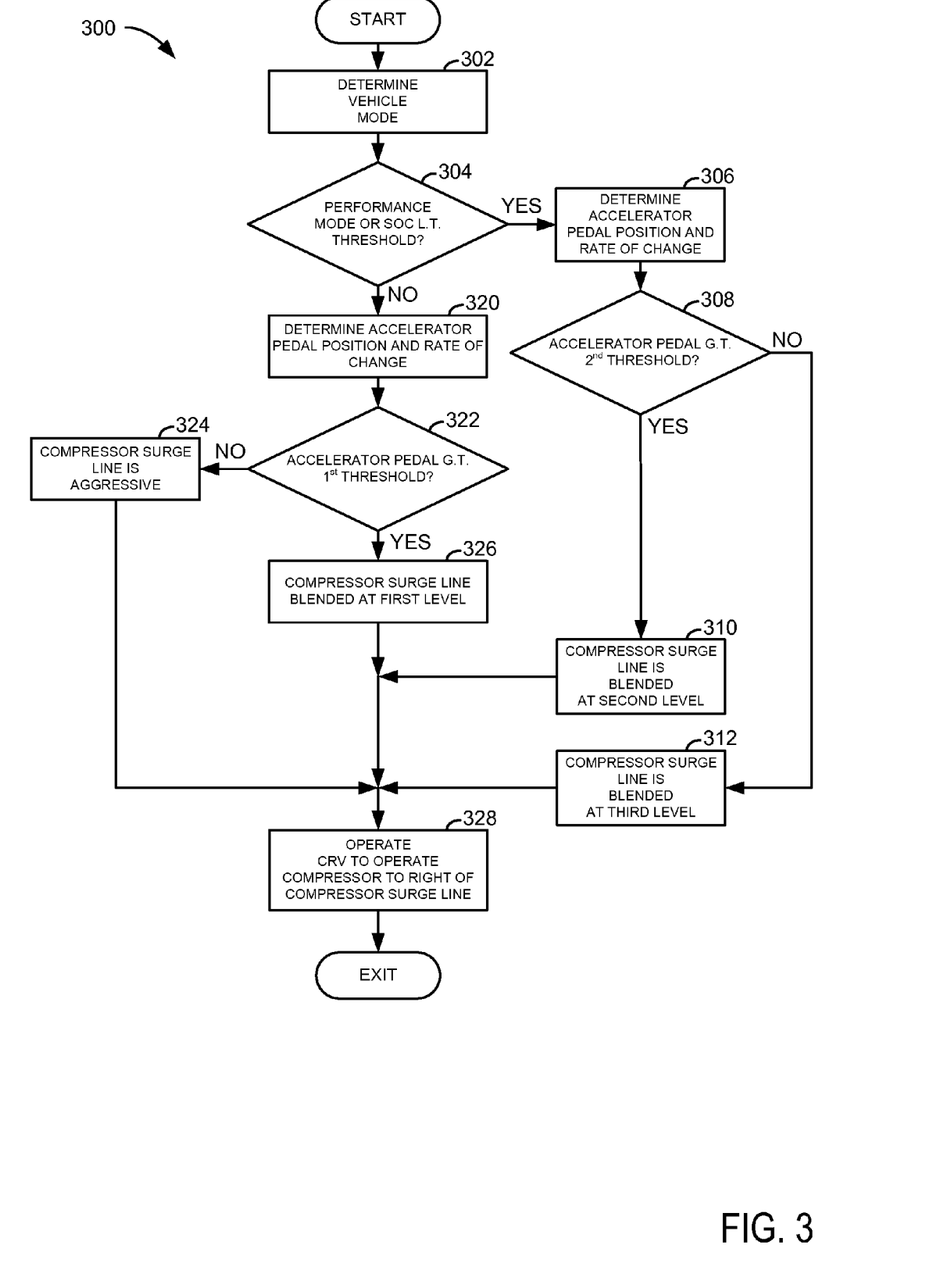
FIG. 3 shows an example method for operating an engine.

Referring now to FIG. 3, a method for operating an engine is shown. The method of FIG. 3 may provide the operating sequence shown in FIG. 4. Additionally, the method of FIG. 3 may be included in the system of FIG. 1 as executable instructions stored in non-transitory memory.

At 302, method 300 determines the vehicle operating mode. The vehicle operating mode may be determined via a vehicle mode selection switch or another type of user interface such as a touch screen panel. The vehicle operating modes may include but are not limited to sport mode or higher performance mode and touring mode or standard performance mode. Additionally, method 300 may determine a battery or energy storage device state of charge (SOC) at 302. In one example, SOC may be determined via battery voltage. Method 300 proceeds to 304 after vehicle mode and SOC are determined.

At 304, method 300 judges if the vehicle is in performance mode or if the SOC is less than a threshold. If method 300 judges that performance mode is selected, the answer is yes and method 300 proceeds to 306. Otherwise, the answer is no and method 300 proceeds to 320.

At 320, method 300 determines accelerator pedal position and rate of accelerator pedal position increase. The rate of accelerator pedal increase may be determined from a first accelerator pedal position at a first time and from a second accelerator pedal position at a second time. The first accelerator pedal position may be subtracted from the second accelerator pedal position. The result is divided by the time difference between the first time and the second time to provide the accelerator pedal rate of change. Method 300 proceeds to 322 after accelerator pedal position and rate of change are determined.

At 322, method 300 method 300 judges if accelerator pedal position is greater than a threshold position. Alternatively, or in addition, method 300 may judge if an increase in accelerator pedal position is greater than a threshold rate. If accelerator pedal position is greater than the threshold position or if the accelerator pedal position increases at a rate greater than the threshold rate, the answer is yes and method 300 proceeds to 326. If accelerator pedal position is less than the threshold position or if accelerator pedal position does not increase at a rate greater than the threshold rate, the answer is no and method 300 proceeds to 324.

At 324, method 300 defines the surge line for turbocharger compressor control and compressor recirculation control to be a soft surge line (e.g., curve 204 of FIG. 2). By defining the soft surge line as the surge line used for controlling the compressor and compressor recirculation valve, soft surge may be avoided. Because the accelerator pedal position is at a low level and not increasing at a fast rate, aggressive surge control may be employed by controlling the compressor and compressor recirculation valve based on the soft surge line. Method 300 proceeds to 328 after the soft surge line is defined as the surge line for controlling the turbocharger compressor and compressor recirculation valve.

At 328, method 300 operates the compressor recirculation valve (CRV) to operate the compressor to the right of the surge line being used for controlling turbocharger compressor surge. For example, if the surge line being used to control the turbocharger compressor is the soft surge line 204 described in FIG. 2, the compressor recirculation valve may be opened as the turbocharger compressor approaches the soft surge line 204 to increase flow through the compressor, thereby moving the turbocharger compressor operating conditions away from the soft surge line 204. Similarly, if the surge line being used to control the turbocharger compressor is a blended surge line similar to surge line 230 described in FIG. 2, the compressor recirculation valve may be opened as the turbocharger compressor approaches the blended surge line 230 to reduce the compressor pressure ratio, thereby moving the turbocharger compressor operating conditions away from the blended surge line 230. The compressor recirculation valve may be closed when the compressor is operating at conditions not near the surge line being used to control the compressor and compressor recirculation valve. Method 300 proceeds to exit after the compressor and compressor recirculation valve are controlled to avoid surge conditions.

At 326, method 300 determines a blended compressor surge line blended at a first level. In one example, the compressor surge line is blended at the first level according to the equation:

$$\text{CRV\_line} = \text{agg\_surgeline} \cdot \frac{1}{1^{st}\text{ threshold} - 1} \cdot (\text{pedal} - 1) +$$
$$\text{base\_surgeline} \cdot \frac{1}{1^{st}\text{ threshold} - 1} \cdot (1^{st}\text{ threshold} - \text{pedal})$$

where CRV_line is the blended surge line that is based on the aggressive or soft surge line and the base surge line, agg_surgeline is the values of the aggressive or soft surge line, $1^{st}$ threshold is a predetermined accelerator pedal position or scaled rate of accelerator pedal change that varies between 0 and 1, pedal is accelerator pedal position or scaled rate of accelerator pedal change which varies between 0 and 1, and base_surgeline is the values of the base surge line. Thus, the equation filters the soft surge line (e.g., curve 204 of FIG. 2) and the base surge line (e.g., curve 202 of FIG. 2) to provide a surge line that is the basis for controlling the turbocharger compressor and compressor recirculation valve. Method 300 proceeds to 328 after the surge line that is the basis for controlling the turbocharger and compressor recirculation valve is determined.

At 306, method 300 determines accelerator pedal position and rate of accelerator pedal position increase. The rate of accelerator pedal increase may be determined from a first accelerator pedal position at a first time and from a second accelerator pedal position at a second time. The first accelerator pedal position may be subtracted from the second accelerator pedal position. The result is divided by the time difference between the first time and the second time to provide the accelerator pedal rate of change. Method 300 proceeds to 308 after accelerator pedal position and rate of change are determined.

At 308, method 300 method 300 judges if accelerator pedal position is greater than a second threshold position. Alternatively, or in addition, method 300 may judge if an increase in accelerator pedal position is greater than a second threshold rate. If accelerator pedal position is greater than the second threshold position or if the accelerator pedal position increases at a rate greater than the second threshold rate, the answer is yes and method 300 proceeds to 312. If accelerator pedal position is less than the threshold position or if accelerator pedal position does not increase at a rate greater than the threshold rate, the answer is no and method 300 proceeds to 310.

At 310, method 300 determines a blended compressor surge line blended at a second level. In one example, the compressor surge line is blended at the second level according to the equation:

$$\text{CRV\_line} = \text{agg\_surgeline} \cdot \frac{1}{2^{nd}\text{ threshold} - 1} \cdot (\text{pedal} - 1) +$$
$$\text{base\_surgeline} \cdot \frac{1}{2^{nd}\text{ threshold} - 1} \cdot (2^{nd}\text{ threshold} - \text{pedal})$$

where CRV_line is the blended surge line that is based on the aggressive or soft surge line and the base surge line, agg_surgeline is the values of the aggressive or soft surge line, $2^{nd}$ threshold is a predetermined accelerator pedal position or scaled rate of accelerator pedal change that varies between 0 and 1, pedal is accelerator pedal position or scaled rate of accelerator pedal change which varies between 0 and 1, and base_surgeline is the values of the base surge line. Thus, the equation filters the soft surge line (e.g., curve 204 of FIG. 2) and the base surge line (e.g., curve 202 of FIG. 2) to provide a surge line that is the basis for controlling the turbocharger compressor and compressor recirculation valve. Additionally, the value of the $2^{nd}$ threshold variable may be adjusted based on energy storage device SOC. In particular, if SOC is lower than a threshold, the $2^{nd}$ threshold variable may be adjusted to move the blended surge line closer to the base surge line. Thus, low SOC biases the blended surge line closer to the base surge line. Method 300 proceeds to 328 after the surge line that is the basis for controlling the turbocharger and compressor recirculation valve is determined.

At 312, method 300 determines a blended compressor surge line blended at a third level. In one example, the compressor surge line is blended at the second level according to the equation:

$$\text{CRV\_line} = \text{agg\_surgeline} \cdot \frac{1}{3^{rd}\text{ threshold} - 1} \cdot (\text{pedal} - 1) +$$
$$\text{base\_surgeline} \cdot \frac{1}{3^{rd}\text{ threshold} - 1} \cdot (3^{rd}\text{ threshold} - \text{pedal})$$

where CRV_line is the blended surge line that is based on the aggressive or soft surge line and the base surge line, agg_surgeline is the values of the aggressive or soft surge line, $3^{rd}$ threshold is a predetermined accelerator pedal position or scaled rate of accelerator pedal change that varies between 0 and 1, pedal is accelerator pedal position or scaled rate of accelerator pedal change which varies between 0 and 1, and base_surgeline is the values of the base surge line. Thus, the equation filters the soft surge line (e.g., curve 204 of FIG. 2) and the base surge line (e.g., curve 202 of FIG. 2) to provide a surge line that is the basis for controlling the turbocharger compressor and compressor recirculation valve. Additionally, the value of the $3^{rd}$ threshold variable may be adjusted based on energy storage device SOC. In particular, if SOC is lower than a threshold, the $3^{rd}$ threshold variable may be adjusted to move the blended surge line closer to the base surge line. Thus, low SOC biases the blended surge line closer to the base surge line. Method 300 proceeds to 328 after the surge line that is the basis for controlling the turbocharger and compressor recirculation valve is determined.

The $1^{st}$ threshold, $2^{nd}$ threshold, and $3^{rd}$ threshold values may be selected such that the $1^{st}$ threshold adjusts the blended surge line to be closer to the aggressive or soft surge line than the $2^{nd}$ and $3^{rd}$ thresholds. The $2^{nd}$ threshold value is selected such that the $2^{nd}$ threshold adjusts the blended surge line closer to the base surge line than the $1^{st}$ or $3^{rd}$ threshold. The $3^{rd}$ threshold is selected such that the $3^{rd}$ threshold adjusts the blended surge line between the surge lines formed by the $1^{st}$ and $2^{nd}$ thresholds.

Thus, the method of FIG. 3 provides for an engine operating method, comprising: providing a first compressor surge line and a second compressor surge line; blending the first compressor surge line and the second compressor surge line into a third compressor surge line; and operating the recirculation valve in response to the third compressor surge line. The method includes where the first compressor surge line is a base compressor surge line and where the second compressor surge line is a soft surge line. The method includes where blending the first compressor surge line and the second compressor surge line includes filtering the first compressor surge line and the second compressor surge line based on accelerator pedal position.

In some examples, the method includes where blending the first compressor surge line and the second compressor surge line includes filtering the first compressor surge line and the second compressor surge line based on battery state of charge. The method includes where blending the first compressor surge line and the second compressor surge line includes filtering the first compressor surge line and the second compressor surge line based on a vehicle operating mode. The method includes where the vehicle operating mode is one of a sport mode and a touring mode. The method includes where filtering the first compressor surge line and the second compressor surge line based on the sport mode biases the third surge line toward the first compressor surge line, and where the first compressor surge line is a base compressor surge line.

In some examples, the method of FIG. 3 provides for an engine operating method, comprising: positioning a compressor recirculation valve in response to a compressor surge line adjusted responsive to a vehicle control parameter. The method includes where the control parameter is a position of an accelerator pedal. The method includes where the control parameter is a state of battery charge. The method also includes where the control parameter is an operating mode of a vehicle. The method includes where positioning the compressor recirculation valve includes partially opening the compressor recirculation valve. The method also includes where the compressor surge line is based on two other compressor surge lines.

Figure 4:
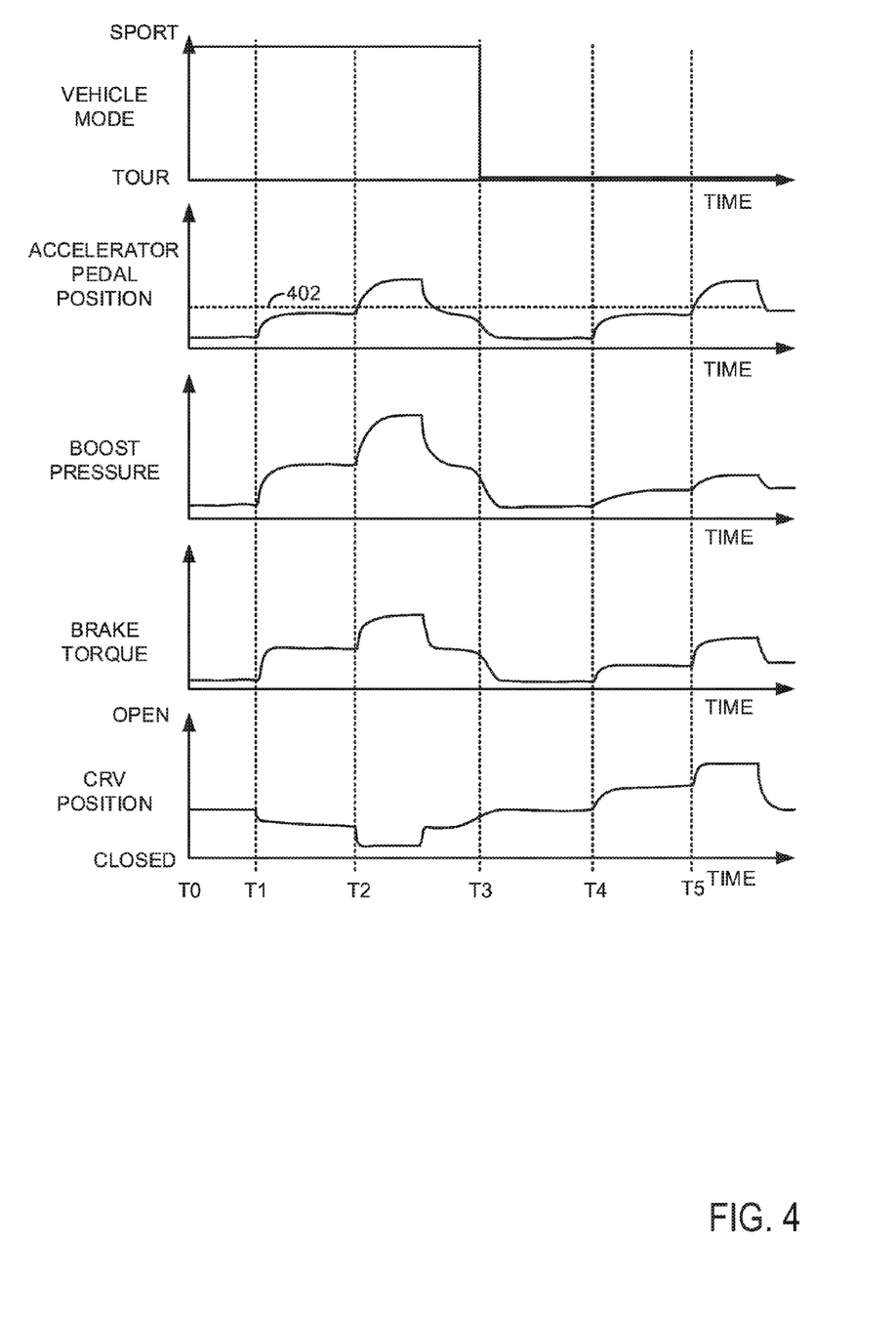
FIG. 4 shows an engine operating sequence based on the method of FIG. 3.

Referring now to FIG. 4, a sequence for operating an engine according to the method of FIG. 3 is shown. The sequence may be provided via the system of FIG. 1. Vertical lines at time T1-T5 represent times of interest during the sequence.

The first plot from the top of FIG. 4 is a plot of a vehicle mode versus time. The vehicle is in a performance or sport mode when the trace is near the Y axis arrow. The vehicle is in a tour or standard performance mode when the trace is at a lower level near the X axis. The X axis represents time and time increases from the left side of the figure to the right side of the figure.

The second plot from the top of FIG. 4 is a plot of accelerator pedal position versus time. The Y axis represents accelerator pedal position and the accelerator pedal position increases in the direction of the Y axis arrow. The X axis represents time and time increases from the left side of the figure to the right side of the figure. Horizontal line 402 represents a first threshold level for determining the blended compressor surge line.

The third plot from the top of FIG. 4 is a plot of boost pressure versus time. The Y axis represents boost pressure (e.g., pressure in the boost chamber) and the boost pressure increases in the direction of the Y axis arrow. The X axis represents time and time increases from the left side of the figure to the right side of the figure.

The fourth plot from the top of FIG. 4 is a plot of the engine brake torque versus time. The Y axis represents engine brake torque and engine brake torque increases in the direction of the Y axis arrow. The X axis represents time and time increases from the left side of the figure to the right side of the figure.

The fifth plot from the top of FIG. 4 is a plot of compressor recirculation valve (CRV) position versus time. The Y axis represents CRV position and CRV position increases in the direction of the Y axis arrow. The X axis represents time and time increases from the left side of the figure to the right side of the figure.

At time T0, the vehicle is operating in sport mode and the accelerator pedal position is at a lower level. The boost pressure and engine brake torque are also at lower levels. The CRV is partially open to allow some compressor output airflow to return to the compressor input.

At time T1, the accelerator pedal increases in response to the driver applying the accelerator pedal. The accelerator pedal position is less than first threshold 402. The boost pressure increases in response to the increased accelerator pedal position and the vehicle operating in sport mode. The engine brake torque also increases in response to the increased accelerator pedal position and the increased boost pressure. The CRV closes a small amount to allow the boost pressure to increase. The boost pressure increases and flow through the compressor increases (not shown) by allowing the compressor surge line to move toward the base surge line based on the vehicle being in sport mode.

At time T2, the accelerator pedal position is increased further and the accelerator pedal position exceeds first threshold level 402. In response to the vehicle being in sport mode and the accelerator pedal position exceeding level 402, the blended compressor surge line is moved toward the base surge line so that boost pressure is allowed to increase further, thereby allowing the brake torque to increase higher and at a faster rate. The CRV is also allowed to close farther to allow the turbocharger compressor to approach the base surge line.

Between time T2 and time T3, the driver releases the accelerator pedal and the boost pressure and the engine brake torque are reduced in response to the lower accelerator pedal position. Additionally, the CRV is opened to reduce boost in response to the accelerator pedal position.

At time T3, the driver selects touring or standard performance mode. The driver may select standard performance mode via a selector switch or a display panel. The accelerator pedal position continues to decline and the engine boost and the engine brake torque are also reduced in response to the lower accelerator pedal position.

At time T4, the driver applies the accelerator pedal at a rate and in an amount similar to the way the accelerator pedal was applied at time T1. The accelerator pedal position is less than threshold 402 and the vehicle is in touring or standard performance mode. Consequently, the boost pressure increases at a slower rate and engine torque also increases at a slower rate as compared to the same variables at time T1. The boost pressure and engine torque are limited by controlling the CRV and compressor to a blended surge line that is closer to the aggressive or soft surge line.

At time T5, the accelerator pedal position is increased further and the accelerator pedal position exceeds first threshold level 402. In response to the vehicle being in touring or standard performance mode and the accelerator pedal position exceeding level 402, the blended compressor surge line is moved toward the base surge line, but less so than at time T2. The boost pressure is allowed to increase further and sooner than at time T3, but less than that at time T2. The CRV opens to allow additional compressor flow to return to the compressor inlet, thereby reducing the compressor pressure ratio. The engine torque and response are lowered, but there may be less compressor audible noise and less compressor surge.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
providing a base compressor surge line and a soft compressor surge line;
combining the base compressor surge line and the soft compressor surge line into an adjusted compressor surge line; and
operating a recirculation valve in response to the adjusted compressor surge line.

2. The engine operating method of claim 1, where combining the base compressor surge line and the soft compressor surge line includes adjusting the base compressor surge line and the soft compressor surge line based on accelerator pedal position.

3. The engine operating method of claim 1, where combining the base compressor surge line and the soft compressor surge line includes adjusting the base compressor surge line and the soft compressor surge line based on battery state of charge.

4. The engine operating method of claim 1, where combining the base compressor surge line and the soft compressor surge line includes adjusting the base compressor surge line and the soft compressor surge line based on a vehicle operating mode.

5. The engine operating method of claim 4, where the vehicle operating mode is one of a sport mode and a touring mode.

6. The engine operating method of claim 5, where adjusting the base compressor surge line and the soft compressor surge line based on the sport mode biases the adjusted surge line toward the base compressor surge line.

7. An engine operating method, comprising:
positioning a compressor recirculation valve in response to a compressor surge line;
adjusting the compressor surge line depending on a vehicle control parameter, the vehicle control parameter including one of an accelerator pedal, a state of battery charge, and an operating mode of a vehicle, where the adjusting of the compressor surge line comprises using different compressor surge lines comprising of: a base compressor surge line, a soft compressor surge line, and an adjusted compressor surge line that is based on combining different compressor surge lines.

8. The engine operating method of claim 7, where positioning the compressor recirculation valve includes partially opening the compressor recirculation valve.

9. The engine operating method of claim 7, where the combining the different compressor surge lines is based on combining the base compressor surge line and the soft compressor surge line.

10. A system, comprising:
an engine;
a turbocharger including a compressor mechanically coupled to the engine;
a recirculation valve positioned in an air intake of the engine in parallel with the compressor; and
a controller including instructions stored in non-transitory memory for adjusting an opening amount of the recirculation valve in response to a compressor surge line that is based on two other compressor surge lines, where a first of the two other compressor surge lines is a base surge line, and where a second of the two other compressor surge lines is a soft surge line.

11. The system of claim 10, where the soft surge line is based on compressor pressure ratios where a slope of a constant compressor speed curve is positive.

12. The system of claim 10, further comprising additional instructions to adjust the compressor surge line based on a vehicle control parameter.

13. The system of claim 12, where the vehicle control parameter is a battery state of charge.

14. The system of claim 12, where the vehicle control parameter is a vehicle operating mode.

* * * * *